United States Patent [19]

Lower

[11] Patent Number: 4,814,071

[45] Date of Patent: Mar. 21, 1989

[54] FLEXIBLE CONNECTOR FOR SCREENING MACHINE

[75] Inventor: William E. Lower, Cincinnati, Ohio

[73] Assignee: Rotex, Inc., Cincinnati, Ohio

[21] Appl. No.: 28,769

[22] Filed: Mar. 23, 1987

[51] Int. Cl.$^4$ .......................... B07B 1/00; F16L 11/11
[52] U.S. Cl. ..................................... 209/243; 138/120;
         193/25 E; 209/240; 285/226; 403/51; 403/223
[58] Field of Search ............... 209/240, 241, 243, 255,
              209/247; 403/50, 51, 223; 285/226, 911;
         138/120, 155, 121; 406/196; 193/25 E, 25 C, 25 S

[56] References Cited

U.S. PATENT DOCUMENTS

| | | | |
|---|---|---|---|
| 428,023 | 5/1890 | Schoff | 138/120 |
| 594,449 | 11/1897 | Weber | 406/116 |
| 1,143,824 | 6/1915 | Haese | 138/120 |
| 1,255,577 | 2/1918 | Berry | 138/120 |
| 1,798,121 | 3/1931 | Jakes et al. | 285/55 |
| 1,822,624 | 9/1931 | Hoeftmann | 138/120 |
| 2,739,089 | 3/1956 | Hageltorn | 285/921 X |
| 3,259,405 | 7/1966 | Heller | 138/121 |
| 3,347,726 | 10/1967 | Wilkinson | 138/121 |
| 4,733,629 | 3/1988 | Hunt et al. | 138/154 X |

FOREIGN PATENT DOCUMENTS

| | | | |
|---|---|---|---|
| 214205 | 3/1958 | Australia | 209/243 |
| 969671 | 6/1958 | Fed. Rep. of Germany | 138/155 |
| 653124 | 2/1963 | Italy | 138/120 |
| 1524033 | 9/1978 | United Kingdom | 138/120 |
| 2134620 | 8/1984 | United Kingdom | 138/118 |
| 2146093 | 4/1985 | United Kingdom | 138/155 |

*Primary Examiner*—James B. Marbert
*Assistant Examiner*—Donald T. Hajec
*Attorney, Agent, or Firm*—Wood, Herron & Evans

[57] ABSTRACT

A flexible connector for screening machines comprises an assembly of a plurality of generally cylindrical, flexible collars. Each collar has an annular endwise bead on a first circumferential end and an annular endwise opening groove within an endwise surface of a second circumferential end. The collars are connected by applying force in an axial direction to adjacent and aligned collars to seat and secure the bead of one collar into the groove of an adjacent collar to form a tube along an axis of connection between a particle chute and a movable screen frame.

3 Claims, 1 Drawing Sheet

FLEXIBLE CONNECTOR FOR SCREENING MACHINE

BACKGROUND OF THE INVENTION

This invention relates to a flexible connector for a screening machine and more particularly to modular flexible connectors which can be assembled to provide connectors of different desired lengths, facilitated replacement of worn areas, and provide an overall increase in flexibility.

Screening machines are used for sizing, sifting or deliquifying a variety of comminuted materials such as food products, abrasives, face and dental powders, pigments, pharmaceuticals, fillers, spirit distillers, mash, clays and clay slips, spices, starch, sugar and many other types of materials. The material to be treated travels from a feed chute, which is generally fixed, through a flexible connector onto a screen surface located beneath the feed chute. The connector is usually a flexible tube of generally circular cross-section which is secured at one end in communication with the feed chute. The opposite end of the connector is secured to the top cover of the frame or box which supports the screen. Similar connectors may be provided below the screen to carry particles after they have been screened.

The screening process generally requires that the screen be gyrated or shaken in a plane transverse to the axis of connection between the feed chute and the screen, and the connector must be flexible to accommodate this movement which is lateral to it. In addition, because the feed chute and the frame are not always in vertical alignment and because the surface of the screen is usually not horizontal, the flexible connector usually bends between its ends. It is known to provide corrugations in flexible connectors to accommodate these bends by permitting compression in the axial direction.

Due to the often near-continuous use of screening machines, the components must withstand cumulative wear and tear. The feed chute and the screen may be made from rigid material, such as metal; however, the connector must be made from bendable material, such as rubber, which is not as durable. The connector is also subjected to the effects of constant gyration. For those machines in which the flexible connector routes the particles along a curved path, some portions of the inside walls of the connector will bear the abrasive effects of free-falling particles passing through it toward the screen. Eventually abrasion from falling particles will wear a hole or split in the connector. Connectors can also fail simply from long-repeated flexing. These conditions require the occasional replacement of worn connectors.

In the past, connectors for screening machines have generally comprised some form of corrugated rubber or fabric sleeve roughly similar to the flexible hose used with a vacuum cleaner. These sleeves have been formed as one piece. When need arises for replacement of the connector, the entire sleeve must be replaced and discarded, regardless of whether replacement was necessitated by excessive wear at only one or two points along the connector. While some replacement of worn parts is necessary, and is therefore to be expected, this replacement and disposal of an entire length of connector due to excessive wear at only one or two particularly troublesome spots constitutes a waste of material and an increase in maintenance costs.

Furthermore, manufacturing capabilities are limited by one piece molding because each desired diameter of connector is required to be formed from a mold having that same diameter. The same limitations are true with respect to the length of the connectors. However, rather than bearing the additional and disproportionate expense required by the forming of a new mold, most screening machine manufacturers simply accommodate their machines to one of the standard diameters or lengths already used in the industry. This is not an optimum solution. The screening process for some applications would benefit from a variation in the diameter or the length of connector.

It is therefore an object of this invention to provide a connector for screening machines which does not require replacement of the entire length of connector due to wear and tear at only one area along its length.

It is another object of this invention to provide a connector which is better able to withstand the abrasive effects caused by particles passing therethrough.

It is still another object of this invention to provide a connector which is more easily manufactured in different diameters or lengths as may be needed for different installations.

SUMMARY OF THE INVENTION

To achieve these ends, a flexible connector for screening machines is provided which comprises an assembly of a plurality of individual flexible segments or collars which are aligned and connected along an axis of connection, between the feed chute and the screen. Each of the flexible collars has an annular endwise bead or rib at one circumferential end and an annular endwise opening groove within an endwise surface of an opposite circumferential end. The annular endwise bead of one collar is seated and secured into the annular endwise opening groove of an adjacent collar when adjacent collars are snapped together to form a connection. Each of the flexible collars has at least one annular corrugation or bendable portion which will permit axial compression and/or bending.

This modular approach to flexible connectors for screening machines accommodates assembly of any desired length of connection, with the capability of replacing individual flexible collars as required by the wear and tear of specific segments along the connector. The use of an annular endwise bead of one collar which snaps into an annular endwise opening groove in an endwise surface of an adjacent collar provides for quick and easy connection with an increase in overall flexibility. Connection is accomplished by simply applying force in the axial direction between adjacent and aligned collars, to snap them together. In addition, the flexible collars of this invention can be manufactured to accommodate any diameter of connection. The collars may be formed by extruding circumferentially, cutting to appropriate length, forming the length into an annular section, and then welding the annular section along a seam parallel to the axis of the collar. In an alternate embodiment, the collars may be formed by molding.

In a modified embodiment, each flexible collar has an internal skirt formed inside it. This internal skirt is circumferentially connected at its upper end to the inside surface of the collar, proximate the axially projecting bead or rib, and has an axial dimension sufficient that it extends beyond the annular endwise opening groove. The skirt protcts the collar from abrasion caused by particles passing therethrough.

DETAILED DESCRIPTION OF THE DRAWINGS

Figure 1:
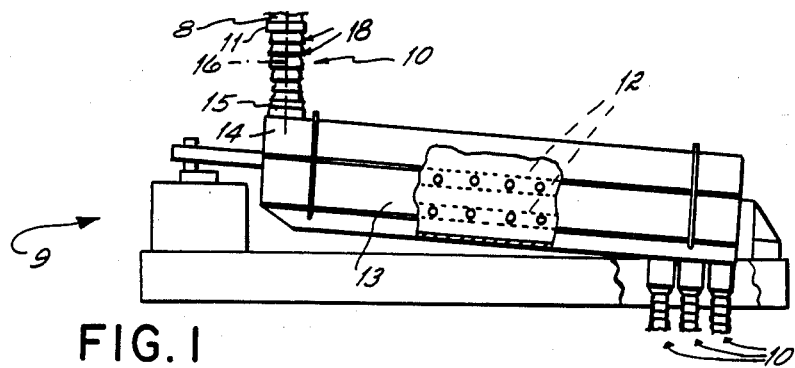
FIG. 1 is a side elevation, partly broken away, of a screening machine to which the flexible connector of this invention has been fitted.

FIG. 1 shows a screening machine 9 fitted with a flexible connector 10 which conveys particles from a feed supply port or chute end 8 through a coupling 11. More specifically, the particles are fed through a top cover 14 which is supported by a screen frame 13. The machine 9 may be conventional and does not comprise the invention; for example, U.S. Pat. No. 2,114,406 in the name of Lowe E. Simpson shows one type of gyratory sifting machine which requires a number of flexible connectors to direct screenable or screened material to or from the screen. Particles are conveyed through the connector roughly along an axis of connection 16 which extends from the coupling 11 to a coupling 15 in top cover 14. From the top cover port 14 the particles are directed onto a screen 12. FIG. 1 also shows the use of additional flexible connectors 10 to route the separated particles away from the screening machine 9 along a desired path, which may pass through another screen. The term "chute" is used herein to include outlet chutes as well as inlet chutes.

In most applications, the feed chute is fixed while the frame 13 and screen 12 are gyrated to cause efficient screening to take place. Efficient screening involves movement of the material along the screen so as to separate the "fines" (smaller particles) from the "overs" (larger particles). The connector 10 must be somewhat axially compressible to accommodate up and down movement, and must also be bendable transversely to axis 16 to accommodate transverse gyrating movement. To provide axial compressibility, flexible connectors 10 typically include numerous annular corrugations 17. These annular corrugations 17 may be either curved or straight edge and must accommodate the bending of connector 10 which is required as port 15 is moved laterally with respect to port 11. At the same time, they must withstand the nearly continuous abrasion caused by particles passing therethrough. In a typical installation the overall connector may be 4", 6", 8" or 10" in diameter, and from 8 to 12 inches long.

Figure 2:
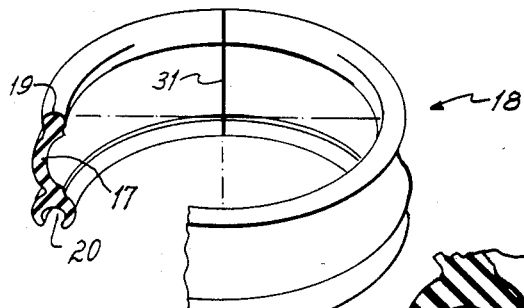
FIG. 2 is an enlarged fragmentary perspective of one collar of the flexible connector of FIG. 1.

By providing a modular approach through the use of an assembly of a plurality of flexible collars 18, this invention facilitates variations in length, replacement of worn parts and greater efficiency in production with an increase in the overall flexibility of the connector. A series of individual flexible collars 18 (FIG. 2) is axially aligned and snapped together to form a flexible tube along the axis of connection 16 between the coupling 11 of the feed chute 8 and the coupling 15 of machine 9. In order to provide a connector in the range of about 9½"–10" long, the flexible collars 18 may generally have an axial dimension of about 1–1½" long (axially).

Each of the plurality of flexible collars 18 has an annular, circular-sectioned endwise projecting bead or rib 19 at one circumferential end and a corresponding circular sectioned annular endwise opening groove 20 within an endwise surface 21 at the opposite circumferential end. Bead 19 has an undercut or narrow neck 22; its arcuate extent is substantially more than 180°, and preferably is about 270°. The bead 19 and groove 20 are sized to form a snap together connection with the bead 19 of one collar 18 seated and locked within the mating groove 20 of an adjacent collar 18. Because each collar 18 has both an annular endwise bead 19 and an annular endwise opening groove 20, a number of collars 18 may be axially aligned and snapped together to form a flexible connector 10 of any desired length. Thus, ease in connection and an increase in flexibility of application is achieved by the bead and groove configuration.

Figure 3:
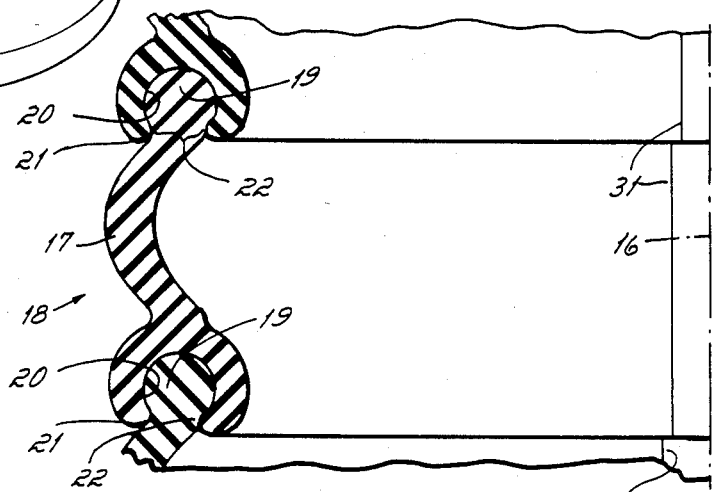
FIG. 3 is an enlarged axial cross-section of one half of the flexible connector of FIG. 1.

It is important that the interlock is formed and retained in the axial direction (or, technically, a direction parallel to the axis of the segment), rather than the radial direction. As shown in FIG. 3, a cross sectional view of the connection at a point on the annulus resembles a socket shaped cross section which provides an elastic lip which is flexible enough to allow insertion of a semi circular cross section. Once snapped into the socket, the surface of the semi circular cross section is gripped by the inside surface of the socket shaped cross section to form a locked connection between collars 18. This arrangement permits both rotation and bending of one collar 18 with respect to an adjacent connected collar 18. The cumulative effect of each collar 18 being both rotatable and bendable with respect to adjacent collars provides good flexibility along the entire length of connector 10. At the same time, this secure and flexible connection of circumferential ends of adjacent collars 18 is achieved simply by applying force in an axial direction to adjacent and aligned collars; it is not necessary to compress the segment radially. As shown in both FIG. 3 and FIG. 4, each flexible collar 18 may also have one or more annular corrugations 17 or bowed regions between its ends, to provide axial compressibility, thereby further increasing the flexibility of the connector 10.

In addition to this increased flexibility, the flexible connector 10 of this invention reduces the cost of replacement parts because each of the flexible collars 18 may be individually replaced. If there is a location along the path of connection which is particularly susceptible to abrasion resulting from free-falling particles striking the inside surface of the connector 10 while passing therethrough, the worn collar 18 in that particular location may be removed and a substitute collar 18 snapped into position without the requirement that the entire length of connection be discarded. Removal and replacement is easily accomplished with the application of force in the respective axial direction. It is desirable that the socket or groove 20 open downwardly, rather than upwardly, so that the material passing through the connector will not lodge in the socket.

Figure 4:
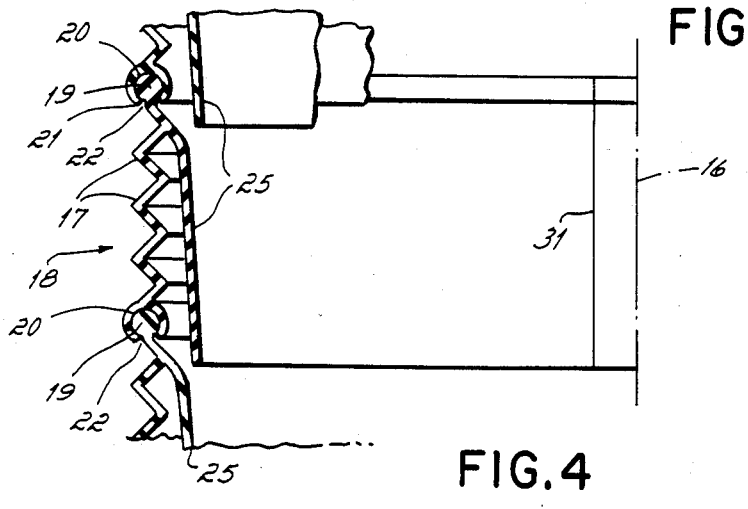
FIG. 4 is a cross-sectional view of a modified or "skirt" embodiment of the flexible connector of this invention.

FIG. 4 shows an alternative embodiment of this invention in which each of the flexible collars 18 is further equipped with an internal skirt 25. This internal skirt 25 is circumferentially sealed or connected to the inside wall of the collar 18 proximate the annular endwise bead 19. The internal skirt 25 preferably has a length in the axial direction that extends below the annular endwise opening groove 20 of the same collar 18, thus preventing particles from abrading against the corrugations 17 of the connector 10 while passing therethrough. This protects the collar 18 from the cumulative abrasive effects caused by direct contact of particles with the inner surface of the collar 18, thus reducing wear and increasing the life of the collar 18.

The flexible collars 18 of this invention may be made from any suitable flexible material which is able to withstand the durability requirements for a screening machine. Suitable material includes polymers, urethanes, plastic compounds or rubber. To form the collars 18, an indefinite length of moldable material is extruded through an aperture having the shape of an expansible section with a semi circular cross section or rib at one side and a socket shaped cross section at an opposite side, cut transversely to an appropriate length, formed into an annulus such that opposite ends of the appropriate length abut along a vertical seam, and welded along the vertical seam, as designated at 31 in FIGS. 3 and 4. The internal skirt 25 is preferably extruded integrally with the collar, cut to length and welded simultaneously with the length of collar material. The flexible collars 18 of this invention may also be formed by molding.

The collars 18 of this invention are not subject to the dimensional constraints imposed by the one piece molding of an entire length for a specific diameter. They can be manufactured to accommodate any desired diameter or length of connection so long as the annular endwise bead 19 and the annular endwise opening groove 20 are matched to size. Thus, this invention results in an increase in manufacturing capabilities.

Other modifications and embodiments will be readily apparent from the foregoing and from the drawings without departing from the scope of the invention if applicant intends to be bound only by the claims appended hereto.

I claim:

1. In a screening machine having a particle chute, a screen mounted on a movable frame, and a flexible connector for conveying particles between said chute and said frame, the improvement wherein said flexible connector comprises:

an assembly of a plurality of generally annular, flexible collars, said collars being aligned and connected together to form a tube along an axis of connection between said chute and said frame, each collar having a first circumferential end and a second circumferential end;

an annular endwise bead on said first circumferential end, and an annular endwise opening groove within an endwise surface of said second circumferential end, the bead of one collar being seated and secured into the groove of an adjacent collar;

each collar having an annular corrugation around it between said bead and said groove and being bendable at said corrugation to accommodate axial deflection between said frame and said chute;

each collar being of elastically bendable and deformable material, the groove thereof being deformable to receive the bead of an adjacent collar in snug, snap-in interfit therewith;

means securing a collar at one end of said tube to said chute; and means securing a collar at a second end of said tube to said frame.

2. A screening machine as in claim 1 wherein said annular endwise bead has a semi circular cross section and each annular endwise opening groove has a socket shaped cross section which is sized to seat and secure an annular endwise bead.

3. A screening machine as in claim 1 further comprising an internal skirt formed in said collar, said internal skirt being circumferentially connected to said collar proximate said annular endwise bead and having an axial dimension sufficient that it extends past said annular endwise opening groove, thereby to protect said collar from abrasion caused by particles passing therethrough.

* * * * *